United States Patent [19]

Gerhardt

[11] Patent Number: 4,621,999

[45] Date of Patent: Nov. 11, 1986

[54] BELT-TYPE PRESS FOR MAKING PARTICLEBOARD, FIBERBOARD, AND LIKE PRESSEDBOARD PRODUCTS

[75] Inventor: Klaus Gerhardt, Rheurdt, Fed. Rep. of Germany

[73] Assignee: G. Siempelkamp GmbH & Co., Krefeld, Fed. Rep. of Germany

[21] Appl. No.: 768,026

[22] Filed: Aug. 21, 1985

[30] Foreign Application Priority Data

Sep. 5, 1984 [DE] Fed. Rep. of Germany ....... 3432549

[51] Int. Cl.[4] .......................... B30B 5/06; B29D 7/14; A23G 1/20

[52] U.S. Cl. .................................................... 425/371

[58] Field of Search ................ 425/335, 371, 373, 329

[56] References Cited

U.S. PATENT DOCUMENTS

| | | | |
|---|---|---|---|
| 3,883,285 | 5/1975 | DeMets | 425/371 |
| 4,015,921 | 4/1977 | DeMets | 425/371 |
| 4,283,246 | 8/1981 | Held | 425/371 X |
| 4,457,683 | 7/1984 | Gerhardt | 425/373 |
| 4,468,188 | 8/1984 | Gerhardt | 425/371 |
| 4,480,978 | 11/1984 | Gerhardt | 425/371 |
| 4,548,133 | 10/1985 | Held | 425/371 X |

FOREIGN PATENT DOCUMENTS 3119529 12/1982 Fed. Rep. of Germany .

*Primary Examiner*—J. Howard Flint, Jr.

*Attorney, Agent, or Firm*—Karl F. Ross; Herbert Dubno

[57] ABSTRACT

A continuously operable belt-type press comprises two endless upper and lower press belts forming a pressing gap in a pressing region, an upper and lower platen, a drive mechanism and a press framework. In the pressing region two rod containers are positioned from which a plurality of rolling rods are fed with spacing from each other, these rolling rods being guided above the upper press belt and below the lower press belt by rod circulating mechanisms each comprising two synchronized first chains each guided over at least one sprocket and first chain drive wheel. In the entrance region of the pressing gap and of the upper and lower platens second chains are positioned over a second chain guide wheel. On the chain rollers of the second chains rolling rods are guided between the first chains and act similar to roller bearings. The first chains and second chains in the entrance region form an entrance V-shaped region symmetrical with respect to a horizontal center plane, in which the press belts press the rolling rods on the chain rollers of the second chain formed with equalizing free play. These second chains act as aligning means for the input of rolling rods perpendicular to the circulating direction. The sprockets and the second chain guide wheels at the entrance end of the press are positioned on a common guide wheel shaft, which is driven rotatably. The guide wheel shaft is at least at a first end supported in a sliding carriage, which by an adjusting motor is shiftable in a horizontal direction.

7 Claims, 9 Drawing Figures

BELT-TYPE PRESS FOR MAKING PARTICLEBOARD, FIBERBOARD, AND LIKE PRESSEDBOARD PRODUCTS

CROSS REFERENCE TO RELATED APPLICATIONS

The present application is related to my commonly owned copending application Ser. No. 767,955, filed concurrently herewith.

FIELD OF THE INVENTION

My invention relates to a continuously operable press for making particleboard, fiberboard, pressedboard products, and the like. More particularly it is related to continuously operable belt-type presses, in which a mat comprising a mixture containing wood chips, fibers, particles, and the like is pressed to produce a rigid board, for example a particleboard, fiberboard, or the like.

BACKGROUND OF THE INVENTION

Belt-type presses for making particleboard, fiberboard, and the like known in the prior art related to my invention generally comprise an endless upper press belt, preferably steel press belt, circulated over at least one upper belt guide roller, a corresponding endless lower press belt, preferably a steel press belt, circulated over at least one lower belt guide roller, these press belts forming a pressing gap in a pressing region of the belt-type press, and a press framework having a lower and an upper platen as well as a drive mechanism.

Into the pressing region between each of the platens and its corresponding press belts rods are fed with spacing from each other, and are guided over a circulation path with the aid of either or both of an upper or lower rod circulation mechanism, wherein each rod circulating mechanism comprises two first or main chains each guided over at least one sprocket and at least one first chain drive wheel, a plurality of interlocked chain, link members having chain bolts attached therein, a plurality of outer running rollers mounted on the chain bolts, and at least one guide rail for the running rollers, the rolling rods being attached between the two first chains with equalizing free play, at least one end of each of the rolling rods having a recess bored therein, in which each one of a plurality of support rods attached to the first chains engage so as to provide the equalizing free play.

At an entrance region of the pressing gap and upstream of the platens a second or bracing chain, comprising a plurality of chain rollers in a triangular configuration guided over at least one second chain guide wheel, is positioned, by the chain rollers of which the rolling rods between a respective pair of the first chains are guided as with roller bearings.

It is understood that the platens are commonly heated.

The press products can include also laminates, rubber products, plastics and the like.

In a known press of this type, as taught in German Patent document DE-OS No. 31 19 529 (see also U.S. Pat. Nos. 4,480,978; 4,468,188, and 4,457,683), the first chain and the second chain associated with the lower press platen in the entrance region form a complete horizontal plane, while the first chain and the second chain of the upper platen are guided slantingly to the pressing gap. Of course in this way an entrance V-shaped region arises, which is not however necessarily symmetrical with respect to a horizontal central plane of the press. That has the result, that the press belt does not or at least not in every case press with adequate force on the chain rollers of the second chain.

The second chain does not belong to a mechanism for the introduction of rolling rods perpendicularly to the circulating direction, it primarily forms an individual entrance press in which the second chain in the prior art is referred to as a press belt.

For the introduction of rolling rods a particular input mechanism is provided which is equipped with connected guide strips or links cooperating with sliding wheels and with driven guide wheels, wherein in the known embodiments the first chains are pushed together or collapsed in the entrance region into a zig-zag shape and are correspondingly guided in the pressing region.

The sprockets and the second chain guide wheels are rigidly supported pivotally on the input end of the press and are not shiftable or pivotable in the horizontal direction. The rolling rods are generally unsupported during their introduction into the pressing region so that there is nothing that ensures the proper alignment. That is all right as long as the presses are not too long. However the belt-type presses in use tend to be very long so that the rolling rods are able to cant in the pressing region and in the pressing gap.

OBJECTS OF THE INVENTION

My invention is based on a desire to construct this type of press so that an exact alignment of the rolling rods perpendicularly to the circulating direction on their introduction into the pressing region can be ensured for very large presses.

It is an object of my invention to provide an improved belt-type press for making pressboard, particleboard, fiberboard, laminates and the like.

It is also an object of my invention to provide an improved belt-type press, in which the rolling rods of the first chain press on the press belts with a uniform pressure in every case at the entrance to the pressing region so that sufficient pressure can be developed in that region.

It is a further object of my invention to provide a belt-type press for making fiberboard, particleboard, or the like pressedboard, wherein an exact alignment of the rolling rods of the first chain perpendicularly to the circulating direction on their introduction into the press region can be guaranteed even for very large presses.

It is also an object of my invention to obviate the drawbacks of prior art presses.

SUMMARY OF THE INVENTION

These objects and others which will become more apparent hereinafter are attained in accordance with my invention in a belt-type press for making particleboard, fiberboard, pressedboard, laminates, and the like comprising an endless upper press belt, preferably a steel press belt, circulated over at least one upper belt guide roller, a corresponding endless lower press belt, preferably a steel press belt, circulated over at least one lower belt guide roller, these upper and lower press belts being positioned to form a pressing gap between the upper and lower press belts in a pressing region, and a press framework having a lower and an upper platen as well as a drive mechanism.

In the pressing region between each of the platens and its corresponding press belt a plurality of rolling rods are fed with spacing from each other, and are guided with a rod circulating mechanism, wherein each rod circulating mechanism comprises two first chains each guided over at least one sprocket and at least one chain drive wheel, a plurality of interlinked chain link members having a plurality of chain bolts, a plurality of outer running rollers mounted on the chain bolts, and at least one guide rail for the running rollers, the rolling rods being attached between the two first chains with equalizing free play, at least one end of each of the rolling rods having a recess bored therein, in which each one of a plurality of support rods attached to the first chains engage so as to provide the equalizing free play.

In an entrance region of the pressing gap and of the platens corresponding to and associated with each press belt a second chain comprising a plurality of chain rollers in a triangular configuration guided over at least one second chain guide wheel is positioned, over whose chain rollers the rolling rods in the region between the sprocket chains are guided similar to roller bearings.

According to my invention the first chains and second chains in the entrance region form an entrance V-shaped region symmetrical with respect to a horizontal center plane, in which the press belts press the rolling rods on the chain rollers of the second chains constructed with an equalizing free play, the second chains operating as aligning chains for the input of the rolling rods perpendicularly to their circulating direction, wherein the sprockets and the second chain guide wheels are mounted on a common guide wheel shaft, which is rotatably driven, and the guide wheel shaft is mounted at least at a first end in a sliding carriage, which is shiftable in a horizontal direction by an adjusting motor, e.g. a servomotor.

In order to construct the second chins with equalizing free play in an easy way, so that the described alignment function for the rolling rods can be practiced, the second chains according to a preferred embodiment of my invention have chain rollers rolling on each other, being structured to provide a compensating free play and therefore being able to take an increased load, which is directly transmitted from roller to roller.

The second chains are also guided over a guide member positioned at the ends of the second chains lying opposite to the ends adjacent the guide wheel shaft, this guide member being mounted on a guide member shaft held in position in said press framework.

In one particular embodiment according to my invention the guide wheel shaft is connected at a second end to a drive shaft of the drive mechanism, and at this second end is supported pivotally, but fixed in place, and that the other first end is attached rotatably to a sliding carriage, which is slidable by means of an adjusting motor.

A common ball bearing type mount can be used to mount the first end of the guide wheel shaft to the sliding carriage.

A similar ball bearing structure can be used at the second end of the guide wheel shaft.

The advantages of the belt-type press of my invention are seen to additionally include that the input of the rolling rods into the pressing region and into the pressing gap perpendicular to the circulating direction can be controlled by sliding the guide wheel shaft in the horizontal direction, which is possible with great precision, because the rolling rods experience a very precise guiding or running on the chain rollers of the second chain, while experiencing equalizing free play, and the press belts, since they press the rolling rods on the chain rollers of the second chain assist this controlled input. That is possible both in the vicinity of the lower platen and the upper platen, since the entrance V-shaped region is symmetrical in the way described above.

Of particular advantage is the fact that in the described way for a precise input perpendicular to the circulating direction in the pressing region, the rolling rods can operate with very simple first chains, and that the kinematics, which the first chains must satisfy, is simplified, since the first chains must no longer be collapsed in zig-zag fashion as in earlier presses.

In addition my invention teaches in combination with the described structure, that the chain link members furthest from the guide rail or closest to the press belts in the pressing region are provided with rolling rod holders, which, depending on the dimensions of that part of the chain link member, have elongated support bolt holes running in the circulating direction of the sprocket chain, which provide the equalizing free play for the rolling rods, so that the support bolts put in the rolling rods are centered in the elongated support bolt holes by a centering spring held in the chain link member, and that every second chain link member of the first chain has elongated chain bolt holes extended in the circulating direction for the round chain bolts, which determine the chain bolt free play.

BRIEF DESCRIPTION OF THE DRAWING

The above and other objects, features, and advantages of my invention will become more readily apparent from the following description, reference being made to the accompanying drawing in which.

SPECIFIC DESCRIPTION

Figure 1:
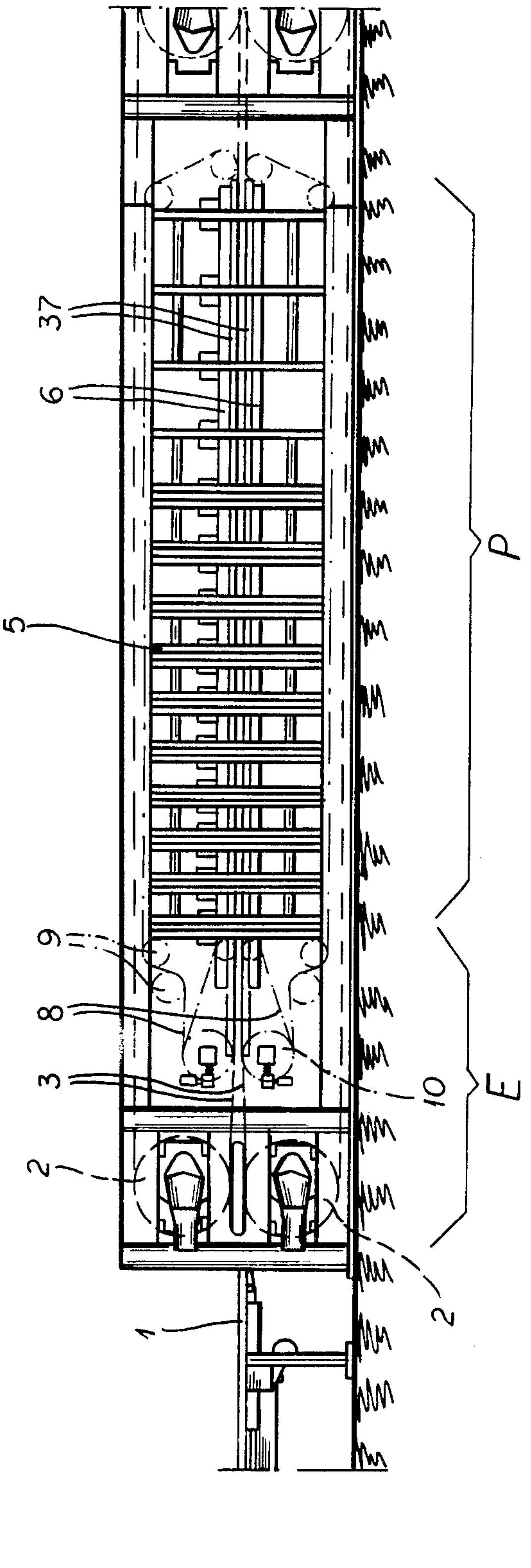
FIG. 1 is a side view of a preferred embodiment of a belt-type press according to my invention.

The continuously operable belt-type press shown in FIG. 1 serves to continuously press a mat of particles and binder into a rigid pressedboard, for example fiberboard, particleboard, and the like.

Usually the material to be pressed is scattered on a suitable feed belt to form a mat containing the wood fibers, chips or the like.

The belt-type press comprises endless upper and lower steel press belts 3 running over upper and lower guide rollers 2. These steel press belts 3 define a pressing gap 4.

The press framework 5 has an upper and lower platen 6, wherein in this preferred embodiment each platen 6 is provided with platen heating means.

In the pressing region P between the platens 6 and the steel press belts 3 an upper and lower rod container 37 from which rolling rods 7 are guided with spacing from each other are positioned, which with the aid of an upper and lower rod circulating mechanism 8 are guided along a circulation path.

Figure 5:
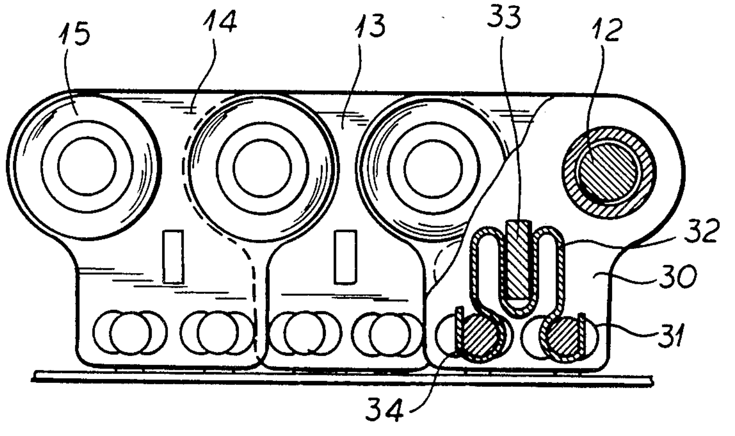
FIG. 5 is a magnified cutaway view of a portion B of the apparatus of FIG. 2 showing in greater detail the structure of the first chain.
Figure 6:
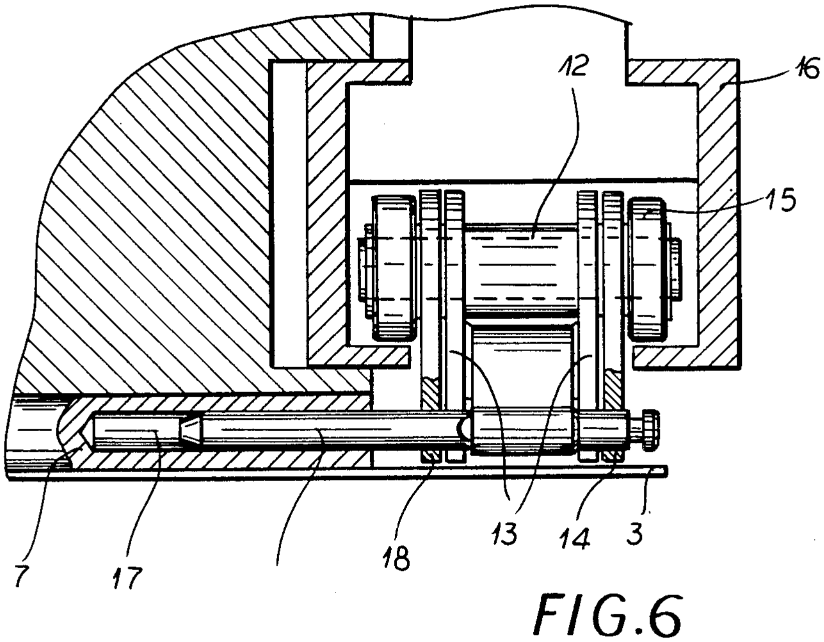
FIG. 6 is a magnified cross sectional view of the guide of the first chain in a belt-type press according to my invention in a plane perpendicular to that of FIG. 5.

The rod circulating mechanisms 8 each comprise two first chains 11 with chain bolts 12 guided over sprockets 9 and at least one first chain drive wheel 10, the combined chain link members (that is, inner link member 13 and outer link member 14) and outer running rollers 15 mounted on the chain bolts 12, and finally the guide rails 16 on which the running rollers 15 travel. As seen in FIGS. 5 and 6 the rolling rods 7 are attached between two first chains 11 with equalizing free play. At least one end of each of the rolling rods 7 has a recess 17 bored therein, in which one of a plurality of support bolts 18 attached to the first chains 11 engage. The support bolts 18 are of a suitable dimension so as to provide the equalizing free play.

Second chain 20 with chain rollers 21 and 22 arranged in a triangular configuration circulating around the second chain guide wheels 19 and 39, of which at least one is driven, are provided in the entrance region E of the pressing gap 4 as well as of the upper and lower platen 6. The chain rollers 21 brace the rolling rods 7 in a manner similar to roller bearings between the sprocket chains 11 (FIG. 2A).

Figure 2:
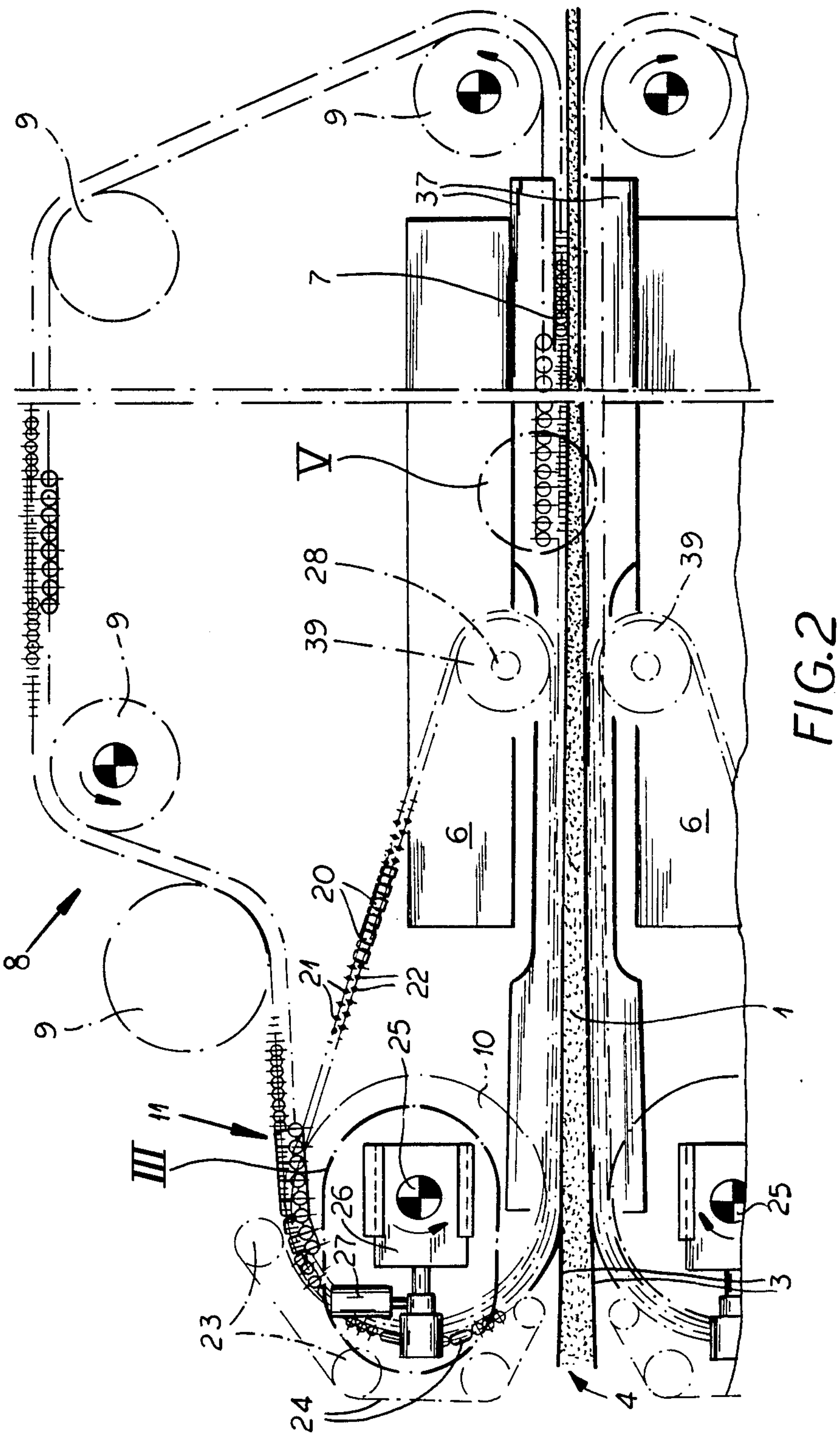
FIG. 2 is a magnified side view of a portion of the apparatus of FIG. 1 showing the first and second chains in greater detail.
Figure 2A:
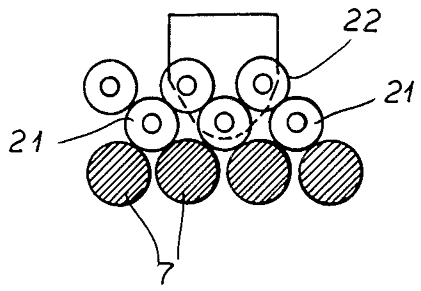
FIG. 2A is a detail showing how the rollers of the auxiliary or bracing chain for position of the rods.
Figure 3:
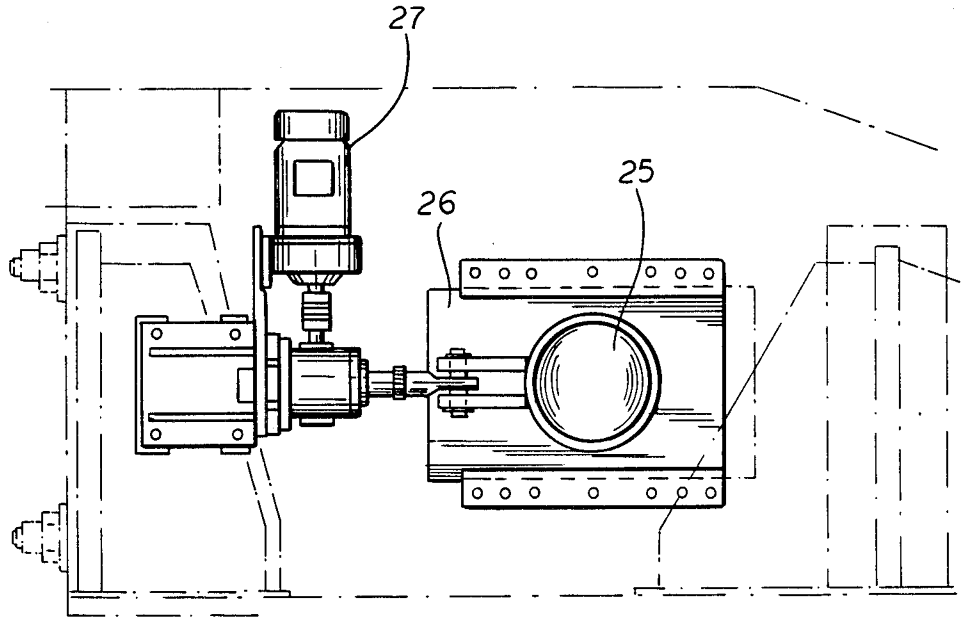
FIG. 3 is a magnified cross sectional view of a part of the apparatus of FIG. 1.
Figure 4:
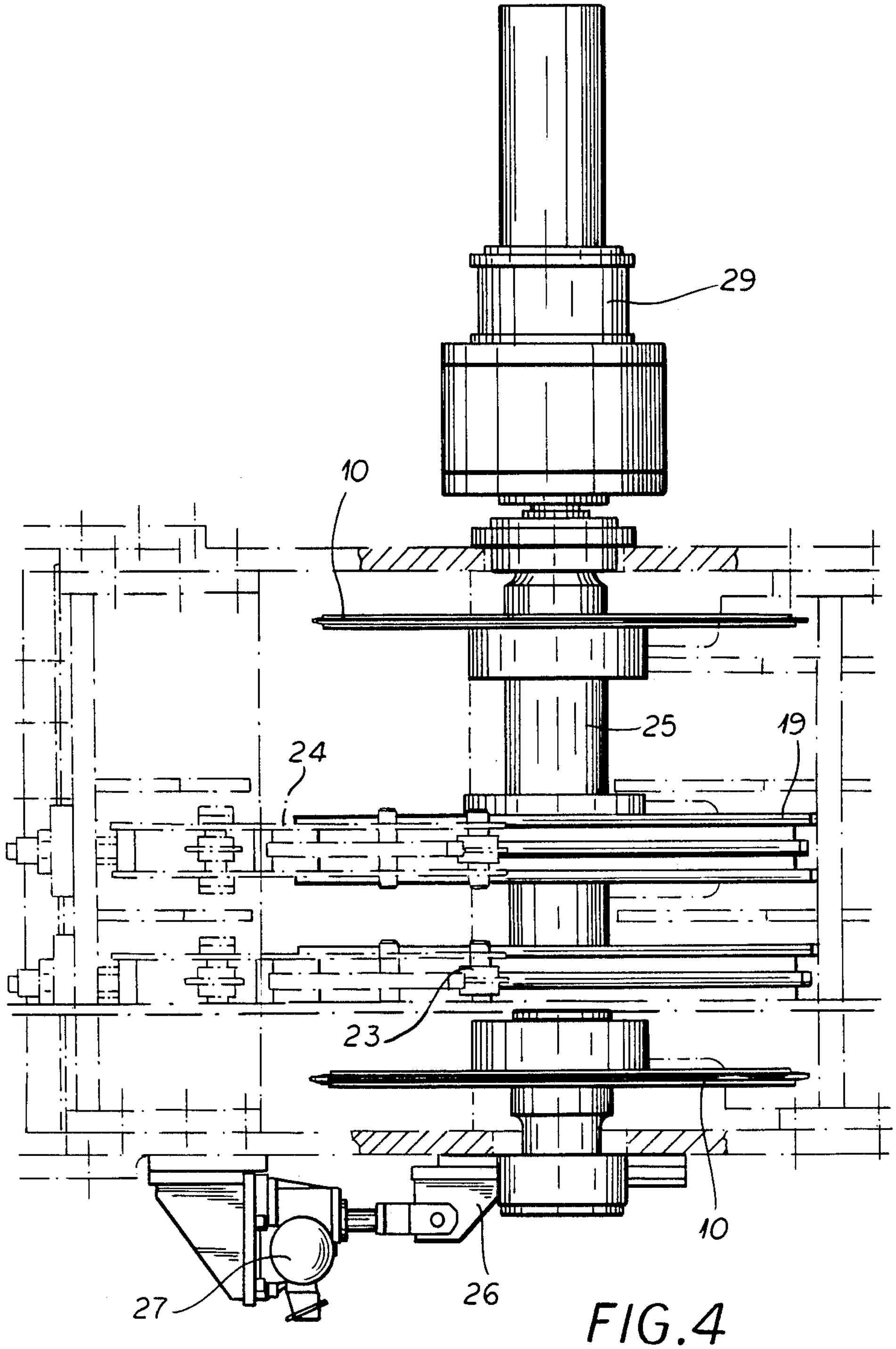
FIG. 4 is a top view of the apparatus of FIG. 3.

Particularly from FIG. 2 one sees further, that the first chain 11 and the second chains 20 form in entrance region E a symmetric entrance V-shaped region with respect to a horizontal center plane. The arrangement is so set up, that in this entrance wedge or V-shaped region the steel press belts 3 press the rolling rods 7 on the chain rollers 21 of the second chains 20, which operate perpendicularly to the circulating direction as aligning chains 20 for the input of rolling rods 7. From a comparison of FIGS. 3 and 4 one observes, that sprockets or the first chain guide wheels 10 of the entrance end of the first chain 11 and the second chain guide wheels 19 of the second chain 20 held in the chain link mamber 13 and 14 as seen in FIGS. 5 and 6. The first chain 11 has a chain bolt free play between the chain bolt 12 and the combined link member 13 and 14, which will be explained further below.

The roller chains 20 fulfill a particular function, namely operating as an aligning chain 20 for aligning rolling rods 7 perpendicularly to the circulating direction.

In this example and according to a preferred embodiment of my invention each rolling rod holder 30 has two elongated holes 31 and two rolling rods 7. The chain link members 13 and 14 are provided with a mounting bar 33, on which a substantially M-shaped centering spring 32 is put. which engages with appropriately curved legs 34 the support bolt 18. In this way it is guaranteed the the rolling rods 7 in reverse operation and until they are engaged by the aligning second chain 20 and/or in the pressing region P are held fixed centrally in the elongated holes 31, and are also centered contact free in the circulating direction.

Figure 7:
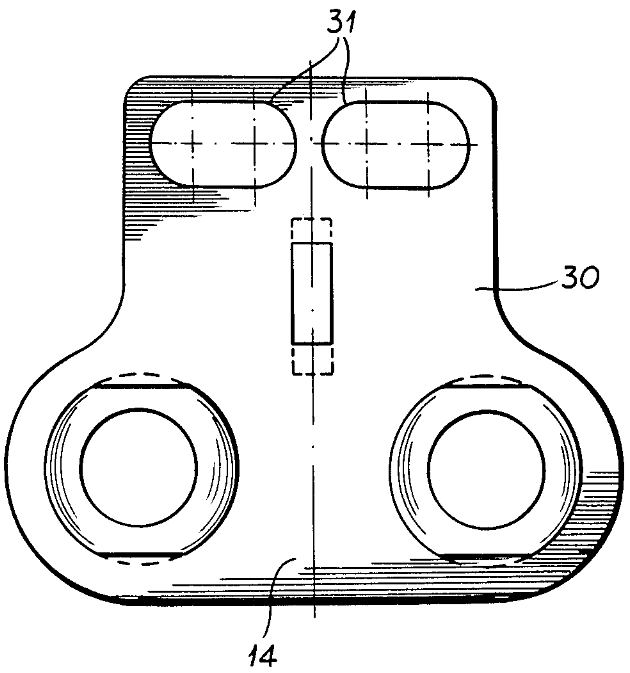
FIGS. 7 and 8 are still more magnified side views of chain link members of the first chain.
Figure 8:
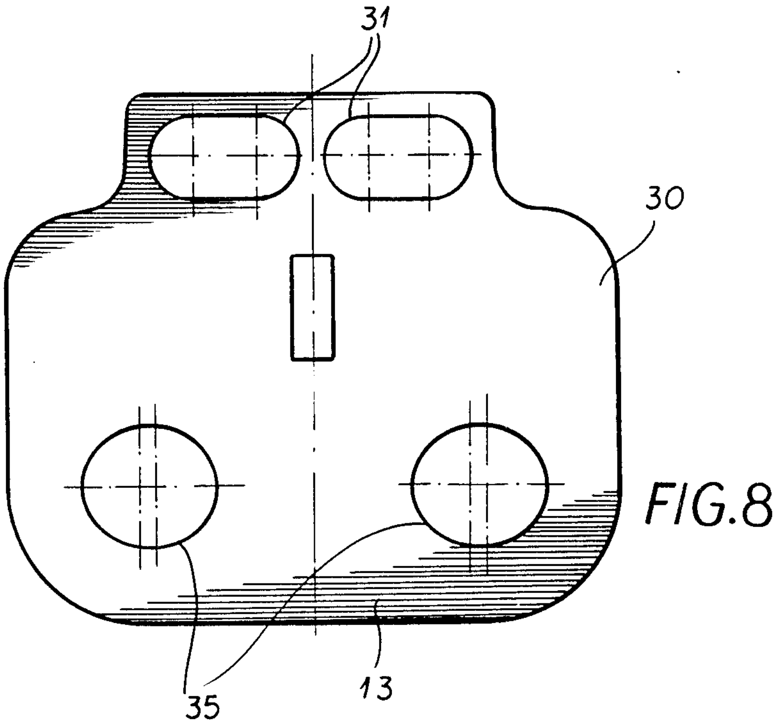

From FIGS. 7 and 8 one sees, that every second chain link member 14 of the first or sprocket chain 11 has chain bolt hole 35 for round chain bolts 12 elongated in the circulating direction of first chain 11, which defines the chain bolt free play. Consequently the first chain 11 can be guided around the sprocket 9, without disturbing forces on the aligning chain 20, which is performed with equalizing free play, and it is guaranteed that, in connection with this circulating and/or guiding an exact alignment of the rolling rods perpendicular to the circulating direction occurs.

From FIG. 2 one learns that the second chain 20 has chain rollers 21 and 22 rolling on each other and therefore a compensating free play is provided. It is in the scope of my invention to provide the entrance end second chain guide wheel 19 for the second chain 20 on at least one side thereof with an additional toothed wheel, in whose tooth gaps the rolling rods 7 engage. The component rolling rod holder 30 can also be omitted, when the centering spring 32 alone takes charge of the rolling rod mounting.

I claim:

1. In a belt-type press for making fiberboard, particleboard, and the like pressedboard products comprising an endless upper press belt circulated over at least one upper belt guide roller, a corresponding endless lower press belt circulated over at least one lower belt guide roller, said upper and lower press belts forming a pressing gap in a pressing region, and a press framework having lower and upper platens as well as a drive mechanism, whereby in said pressing region between each of said upper and lower platens and the corresponding one of said upper and lower press belts a rod container is positioned from which a plurality of rolling rods are fed with spacing from each other, and are guided by one of an upper and lower rod circulating mechanism, wherein said upper and lower rod circulating mechanisms each comprise two first chains each guided over at least one sprocket and at least one first chain drive wheel, a pluarlity of interlinked chain link members having a plurality of chain bolts, a plurality of running rollers mounted on said chain bolts, and at least one guide rail for said running rollers, said rolling rods being attached between said two first chains with equalizing free play, at least one end of each of said rolling rods having a recess bored therein, in which one of a plurality of support bolts attached to one of said first chains engages so as to provide said equalizing free play, and wherein in an entrance region of said pressing gap and of said upper and lower platens an upper and lower second chain each having a plurality of chain rollers in a triangular configuration, each of said second chains being guided over at least one second chain guide wheel, are positioned, said rolling rods between said first chains being guided on said chain rollers similar to roller bearings, the improvement wherein said first chains and said second chains in said entrance region form an entrance V-shaped region symmetrical with respect to a horizontal center plane, in which said press belts press said rolling rods on said chain rollers of said second chains constructed with said equalizing free play, said second chains operating as aligning chains for said input of said rolling rods perpendicular to the circulating direction of said rolling rods wherein said sprockets and at least two of said second chain guide wheels are mounted on a guide wheel shaft, which is driven rotatably, and said guide wheel shaft is mounted at least at a first end in a sliding carriage, which by an adjusting motor is shiftable in a horizontal direction.

2. The belt-type press according to claim 1 wherein said press belts comprise steel press belts and said horizontal direction is substantially the direction said press belts are circulated in said pressing region.

3. The belt-type press according to claim 1 wherein said second chains have said chain rollers rolling on each other, and by that provide said equalizing free play.

4. The belt-type press according to claim 1 wherein each of said second chains are guided over a guide member positioned at the ends of said second chains lying opposite from said guide wheel shaft, said guide member being mounted on a guide member shaft held in position in said press framework.

5. The belt-type press according to claim 1 wherein said guide wheel shaft is mounted in said press framework at a second end opposite to said first end attached to a drive shaft of said drive mechanism, and is rotatably supported at said second end.

6. The belt-type press according to claim 1 wherein said chain link members are provided with rolling rod holders on the ends of said chain link members closest to said press belt in said pressing region, which, depending on the dimensions of said first chain, have at least one elongated support bolt hole positioned so that said elongated support bolt holes in said first chains run in said circulating direction, said elongated support bolt holes providing said equalizing free play for said rolling rods, said support bolts inserted in said rolling rods are centered in said elongated support bolt holes by a centering spring held in said chain link member, and that every second one of said chain link members has a chain bolt hole for receiving said chain bolts elongated in said circulating direction, which provides said chain bolt free play.

7. In a continuous press for the production of pressed-board wherein upper and lower endless pressing belts converge in an intake zone and thereafter pass through a pressing zone between platens, and a pair of rod conveyors have endless chains straddling the press platens and convey respective successions of rods with play between each belt and the respective platen, the improvement which comprises in combination:

a respective shaft carrying sprocket wheels for each of the chains of said rod conveyors at an upstream end of said intake zone above and below a horizontal median plane between said belts;

a respective orienting roller chain engulfing the rods of each of said rod conveyors over the full length of said intake zone and having a sprocket wheel mounted on said shaft;

a respective bearing slide rotatably journaling one end of each of said shafts and shiftable horizontally to control the positions of said sprockets; and respective servomotors connected to said slides for horizontally shifting same.

* * * * *